United States Patent
Selli et al.

[11] Patent Number: 6,086,263
[45] Date of Patent: Jul. 11, 2000

[54] ACTIVE DEVICE RECEPTACLE

[75] Inventors: Raman K. Selli, Austin; Donald G. Doss, Round Rock; George W. Parrett, Austin; James K. Guenter; Phillip W. Waltrip, both of Garland, all of Tex.

[73] Assignee: 3M Innovative Properties Company, St. Paul, Minn.

[21] Appl. No.: 08/664,039

[22] Filed: Jun. 13, 1996

[51] Int. Cl.⁷ ............................................. G02B 6/36
[52] U.S. Cl. .............................. 385/88; 385/83; 385/33; 385/92; 385/93
[58] Field of Search ................................. 385/44, 49, 88, 385/89, 90, 91, 92, 93, 94, 33, 83

[56] References Cited

U.S. PATENT DOCUMENTS

| | | | |
|---|---|---|---|
| 4,045,121 | 8/1977 | Clark | 350/96 |
| 4,135,783 | 1/1979 | Kunze | 350/96 |
| 4,220,398 | 9/1980 | Dalgoutte et al. | 350/96.21 |
| 4,225,214 | 9/1980 | Hodge et al. | 350/96.21 |
| 4,277,135 | 7/1981 | Schrott et al. | 350/96.21 |
| 4,611,884 | 9/1986 | Roberts | 350/96.15 |
| 4,756,591 | 7/1988 | Fischer et al. | 350/96.21 |
| 5,181,264 | 1/1993 | Chiaretti et al. | 385/33 |
| 5,319,729 | 6/1994 | Allen et al. | 385/90 |
| 5,381,498 | 1/1995 | Bylander | 385/83 |
| 5,452,388 | 9/1995 | Rittle et al. | 385/92 |
| 5,469,522 | 11/1995 | Fan . | |
| 5,748,822 | 5/1998 | Miura et al. | 385/90 |

FOREIGN PATENT DOCUMENTS

| | | | |
|---|---|---|---|
| 244225 | 4/1987 | European Pat. Off. | G02B 6/36 |
| 0 374 136 | 6/1990 | European Pat. Off. | G02B 6/38 |
| 0569181 | 11/1993 | European Pat. Off. | 385/49 |
| 0 610 676 | 8/1994 | European Pat. Off. | G02B 6/38 |
| 0 788 002 | 8/1997 | European Pat. Off. | G02B 6/38 |
| 3508627 | 9/1986 | Germany | G02B 6/42 |
| 57-142607 | 9/1982 | Japan | G02B 7/26 |
| 58-090607 | 5/1983 | Japan | G02B 7/26 |
| 60-60606 | 4/1985 | Japan | 385/49 |
| 63-307408 | 12/1988 | Japan | G02B 6/36 |
| 3-213808 | 9/1991 | Japan | 385/49 |
| 09026529 | 1/1997 | Japan | G02B 6/42 |
| 1481290 | 5/1975 | United Kingdom | G02B 5/14 |
| 2279155 | 12/1994 | United Kingdom | 385/49 |

OTHER PUBLICATIONS

Shimada et al., "Integrated Coupling Device Between a Laser Diode and an Optical Fiber Using a Microlens", Electronics and Communications in Japan, Part 2, vol. 77, No. 8, pp. 45–53.

Ando et al., "Advanced Optical Connectors for Single–Mode Fibers", New Technologies, NTT Review, vol. 3, No. 3, May 1991, pp. 110–121.

*Primary Examiner*—Hung N. Ngo
*Attorney, Agent, or Firm*—John A. Fortkort

[57] ABSTRACT

A receptacle for terminating an optical fiber at an active device such as a photodetector or solid-state light source. The receptacle includes a housing, a termination fixture and an active device. The housing has an opening for receiving the terminal portion of an optical fiber, a door located at the opening, biased to a closed position and having a latch for releasably receiving an optical fiber plug, and a removable plate allowing access to an interior of the housing. The termination fixture and the active device may be mounted to a common substrate attached to an interior portion of the housing. The termination fixture includes a base and a projection attached to the base proximate a light-transmitting portion thereof, the projection having a fiber-receiving groove directed toward a fiber stop surface located on the light-transmitting portion of the base. The base can have a lens integrally molded with the light-transmitting portion. The active device is positioned with respect to the termination fixture to receive light from, and/or transmit light to, any fiber whose terminal portion is located in the V-groove and abutting the fiber stop. An optional optical plate may be used to adjust the optical characteristics of the termination fixture.

27 Claims, 9 Drawing Sheets

ACTIVE DEVICE RECEPTACLE

BACKGROUND OF THE INVENTION

1. Field of the Invention

The present invention generally relates to devices for interconnecting optical fibers, and more particularly to a device for terminating at least one optical fiber used as a telecommunications line (voice, data, video, etc.) at an active optical device, such as a photodetector or solid-state light source.

2. Description of the Prior Art

Optical fibers have replaced copper wire as the preferred medium for carrying telecommunications signals. As with copper wire, it is necessary to provide for the interconnection of optical fibers, during installation, repair or replacement of the fibers, and to terminate the fibers onto active optical devices. Optical devices include, for example, optical sensors (photoelectric diodes) and light sources (LED's, laser diodes). The termination of an optical fiber may be indirect, i.e., the fiber may be connected to some other (passive) optical device such as a beam splitter or polarizer, before the light beam is directed to the active optical device. The present invention is generally directed to a receptacle for a termination of an optical fiber.

In the fiber optic connector described in U.S. Pat. No. 5,381,498, the connector has a plug and a receptacle, the plug having a fiber-receiving, V-shaped groove for each fiber to be interconnected, with the end of the fiber terminating in the middle of the groove. The receptacle has a plate which retracts as the plug is inserted, whereby another fiber is lowered into the V-groove of the plug. Upon full insertion of the plug, the two fibers ends are in contact, and the fiber secured to the receptacle is elastically deformed to maintain a continuous compressive load between the terminal ends of the fibers. The connector provides for the quick disconnection and reconnection of a plurality of optical fiber pairs, without the use of ferrules or other alignment members. High strength fiber may be used to withstand repeated insertions and bowing of the fibers. The exact lengths of fibers (i.e., the relative locations of their terminal ends in the plug and receptacle) are not critical since tolerance is provided by the slack taken up in the bowed receptacle fiber (the terminal portion of the fiber secured to the plug does not bow, but always remains straight). The ends of the fibers may be prepared by simply cleaving and beveling; the end faces may optionally be cleaved at an angle (i.e., non-orthogonal to the fiber axis) to reduce signal reflections.

Many fiber optic splices employ plate elements having fiber-receiving grooves, with means for clamping the terminal ends of the fibers in a common groove. Some of these devices are designed to interconnect a plurality of pairs of fibers, such as the splice shown in U.S. Pat. No. 5,151,964. In U.S. Pat. No. 4,028,162, fibers approach alignment grooves at a glancing angle and are held temporarily while a connector plate is adhered to the interconnected fibers. For other examples of techniques involving bowed fibers entering alignment grooves, see U.S. Pat. Nos. 4,077,702, 4,148,559 and 5,080,461, and French Patent Application No. 2,660,442. Some of the connector designs using the principle of bowing a fiber into a fiber-alignment groove are rather complex and require many parts, such as the designs seen in U.S. Pat. Nos. 4,045,121, 4,218,1133 and 4,767,180. In U.S. Pat. No. 4,322,127, an alignment plate holds a fiber in a groove of a mold while a cast is made about the fiber. The solidified plug can then be removed from the mold.

The connector in the '498 patent makes use of the fiber bowing principle, but suffers certain other disadvantages. For example, the plug design allows dust to easily settle on the tips of the fibers, since these tips are exposed above the fiber-receiving grooves. Fibers in the receptacle may similarly become contaminated since there is no door or other means to close off the opening when the plug is not present. While the '498 connector has fewer parts than most ferrule connectors, it would still be preferable to eliminate the moving parts, such as the sliding plate and spring inside the receptacle. That design also recommends the use of high-strength fibers in the socket, making it less compatible with an embedded base of standard fiber. This patent, as with several others above, does not explain how the device might be used for termination. It would, therefore, be desirable and advantageous to devise an active device receptacle which similarly provides for the quick disconnection and retermination of one or more optical fibers, and which is simple to install and use, but further overcomes the foregoing limitations without sacrificing performance or cost.

SUMMARY OF THE INVENTION

The present invention provides an optical fiber receptacle generally comprising (i) a termination fixture having a projection with a fiber-alignment groove formed in the projection, and a base attached to the projection, the base having a fiber stop, and (ii) means for aligning the termination fixture with an active device. The receptacle is advantageously used in conjunction with a plug having a hollow plug body with a distal end, the interior of the plug body having sufficient space to allow the terminal portion of a bare optical fiber to bow, and the distal end having a slot providing access to the terminal portion of the fiber. The receptacle has an opening sized to receive the distal end of the plug body, and the termination fixture is located to position the fiber-alignment groove to receive the terminal portion of the plug fiber as the plug body is inserted in the receptacle. When the plug is fully inserted in the receptacle, the plug fiber becomes bowed to maintain a continuous compressive load against the fiber stop. The bending of the plug fiber also maintains the fiber firmly nested in the fiber-alignment groove. Latch means are preferably provided for releasably securing the plug body in the receptacle. The plug may be biased in the interconnected position to be pushed back against the latch means to minimize the effect of manufacturing tolerances.

Various active devices, such as photodetectors or solid-state light sources, can be positioned appropriately with respect to the termination fixture to operatively connect with the light-transmitting portion of the fixture base, i.e., with the terminal end of the fiber. The termination fixture may be mounted on a substrate which also bears the active device, the substrate being located within the receptacle. A larger receptacle with multiple openings may be provided to house a series of termination fixtures for simultaneous termination of a plurality of fibers. The active device receptacle thus shares many of the advantages of the connector such as ease of use and quick termination, disconnection, and re-termination. The termination fixture may further be designed to receive one of many different optical plates having, e.g., a lens thereon, to facilitate manufacturing and assembly.

BRIEF DESCRIPTION OF THE DRAWINGS

The invention will best be understood by reference to the accompanying drawings, wherein.

DESCRIPTION OF THE PREFERRED EMBODIMENT

Figure 1:
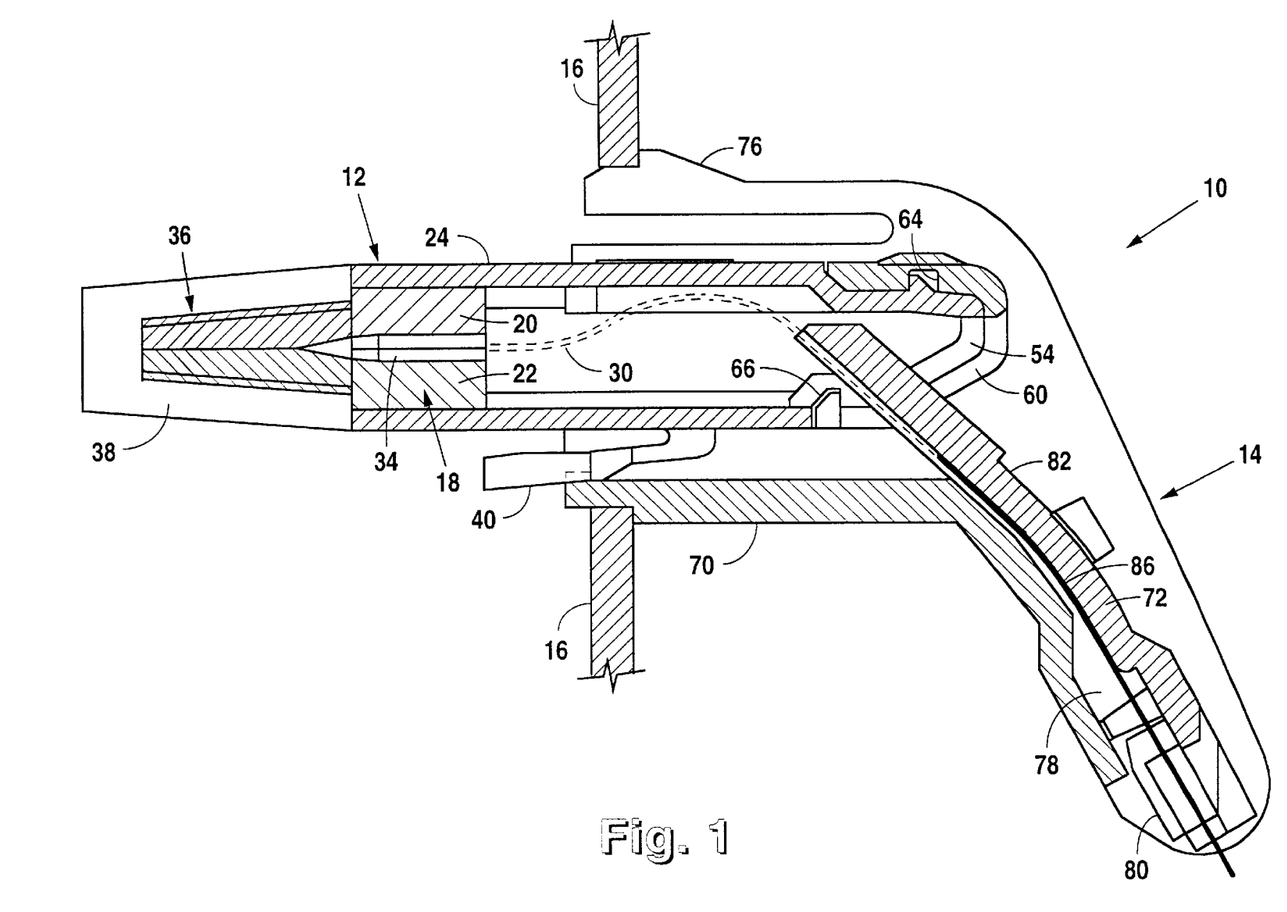
FIG. 1 is a longitudinal section of a fiber optic connector including a plug which is usable with the present invention.
Figure 2:
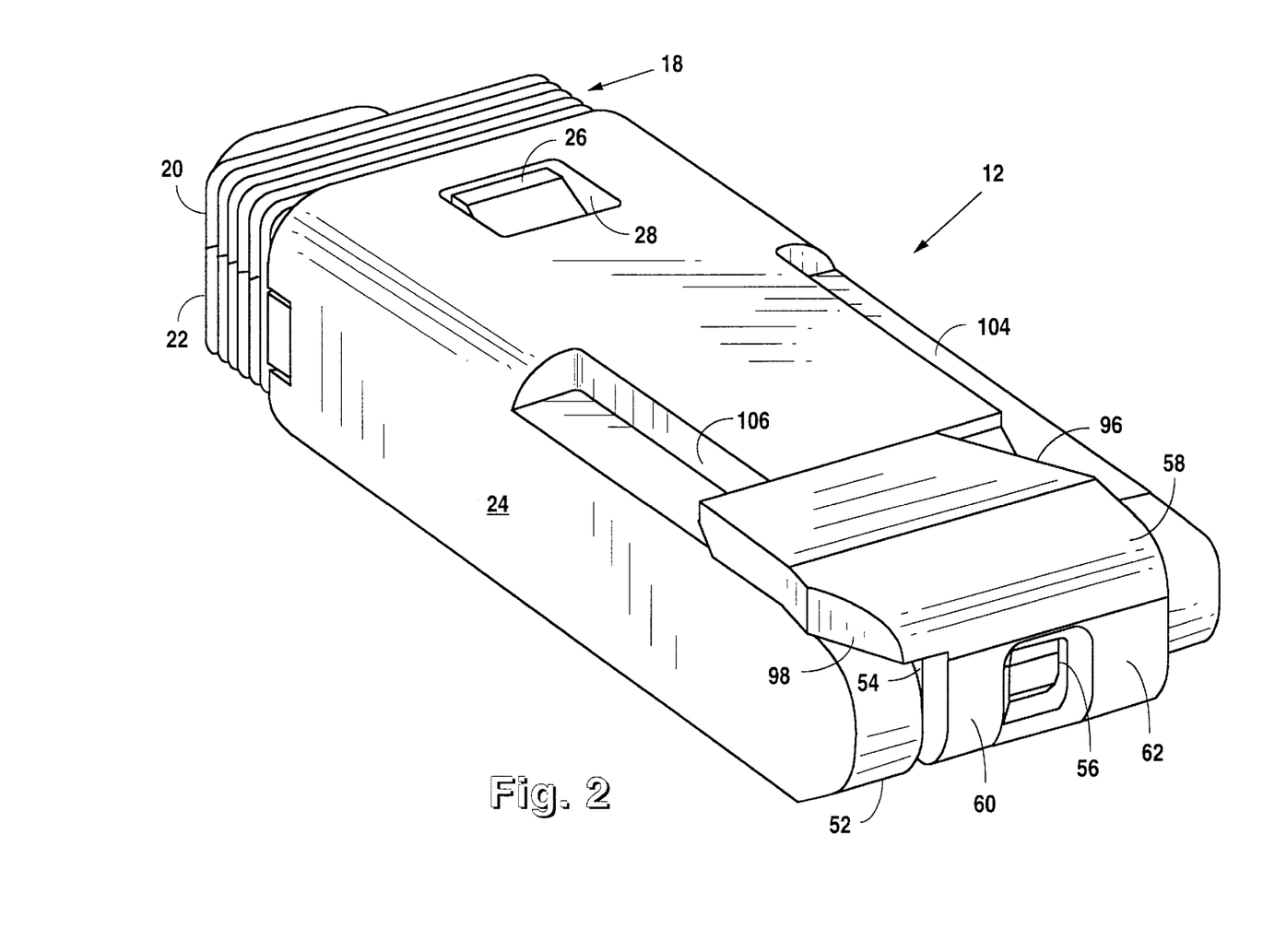
FIG. 2 is a perspective view of one embodiment of a plug used with the present invention, with a sliding door.

With reference now to the figures, and in particular with reference to FIGS. 1 and 2, there is depicted a fiber optic connector 10 having a plug 12 which is particularly useful in conjunction with the present invention. See U.S. patent application Ser. No. 08/577,740. Connector 10 is designed for fiber-to-fiber interconnection, and is further generally comprised of a fiber-to-fiber interconnection receptacle 14. FIG. 1 is a longitudinal section of connector 10 showing, plug 12 fully inserted in receptacle 14, and receptacle 14 mounted on a support surface or bulkhead 16. Those skilled in the art will appreciate that the inventive concepts described herein extend to single pair interconnection as well as interconnection of a multiplicity of pairs.

Plug 12, shown also in, includes a fiber holder 18 which may be constructed of two clamping elements or blocks 20 and 22, and a plug body or shroud 24 which is attached to fiber holder 18. Shroud 24 may be removably attached to plug fiber holder 18 by means of, e.g., latches 26 integrally molded onto blocks 20 and 22, which engage cutouts 28 formed in corresponding walls of shroud 24. Fiber 30 which is to be interconnected or terminated passes through holder 18 and into the hollow interior of shroud 24. The terminal portions of the fiber is bare, that is, it is not affixed to any alignment member such as a ferrule. Shroud 24 therefore serves not only to assist in physically locating plug 12 in interconnection receptacle 14, but also to provide protection for the otherwise exposed terminal portion of the fiber (the shroud could be made retractable to fully expose the fiber tip, if required). Holder 18 has fiber-receiving grooves 34 formed in the adjacent surfaces of blocks 20 and 22; these two components may be identical parts. Holder 18 may secure the fibers, for example, by clamping, adhesives or both. Alternative means may be used to secure the fibers to holder 18. Holder 18 may have an extension 36 surrounding the fibers for additional strain relief and clamping. A boot 38 may be provided for further strain relief and capturing of the strengthening members in the fiber cable (KEVLAR strands), and to assist in handling plug 12. The strengthening members need not be crimped but they may be adhered onto the holder. Strain relief of the strengthening members is attained by a force fit of straightwall section of the plug fiber holder within the boot. This is dependent upon the choice of materials used for the boot and the plug fiber holder, and yields a design that does not require a crimp ring and which assists in ease of manufacture and reduces the number of needed components. Alternatively, an extension may be formed on the holder with a "torture" (irregular) path for clamping the strands and retaining the boot with an interference fit. One-way barbs on the surface of the plug fiber holder assist in the attachment of the boot to the plug fiber holder, which also assists in the attachment of the cable to the plug.

In the embodiment of FIG. 1, a latch 40 is integrally molded onto one side of shroud 24 to releasably secure plug 12 to receptacle 14. Latch 40 also imparts mechanical polarization to the plug, i.e., it can only be inserted into receptacle 14 in one orientation. Plug 12 may be biased in the interconnected position, e.g., by a springboard (a flexible cantilever) formed inside receptacle 14, to be pushed back against latch 40 to minimize the effect of manufacturing tolerances.

Figure 3:
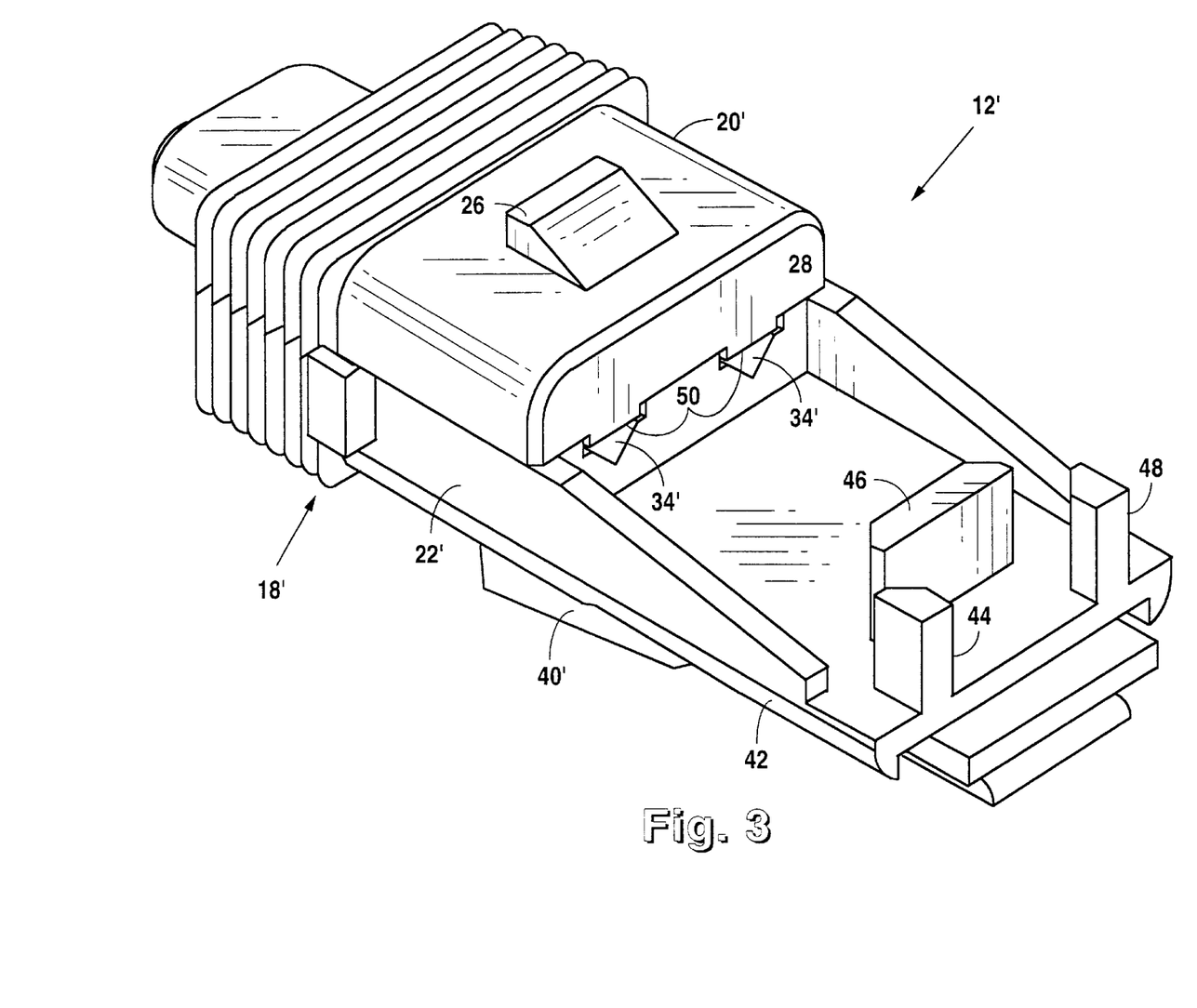
FIG. 3 is a perspective view of another embodiment of a plug used with the present invention, with the plug shroud omitted to reveal interior details.

FIG. 3 depicts a slightly different embodiment 12' of a plug usable with the active device receptacle of the present invention. This embodiment employs a similar shroud, which is omitted from FIG. 4 to better illustrate the alternative fiber holder 18' and interior features. Holder 18' is again formed from two blocks 20' and 22', but those two blocks are not identical in this embodiment. First, block 22' has an extension or landing 42 which has several upstanding posts 44, 46 and 48. These posts serve to guide the fibers within shroud 24 in proper position for location in the V-grooves of receptacle 14 as discussed further below, and limit skewing of the fibers, ensuring proper alignment of the fiber tips with openings in shroud 24. Latch 40' is molded into block 22', along the underside of landing 42. Second, the fiber passageways in holder 18' are formed by providing V-shaped grooves 34' only in block 22', with the corresponding surface of block 20' being flat to provide only three fiber-clamping surfaces. V-grooves 34' are further recessed in block 22', and steps 50 are formed on block 20' which seat in the recesses and facilitate proper attachment of the blocks together.

Fiber 30 with generally straight within shroud 24 whenever plug 12 (or plug 12') is not installed in receptacle 14. The fiber is "generally" straight in that it extends without significant bowing, although there might be some minute flexing of the fiber, e.g., as a result of gravity or plastic deformation. Sufficient space is provided within shroud 24, however, to allow the fibers to bow significantly, as seen in FIGS. 1 and 2, when the plug is fully inserted into the receptacle. The forward end 52 of shroud 24 has a pair of slots 54 and 56 formed therein which provide access to the terminal ends of the fibers located within shroud 24. A hood or door 58 is slidably attached to forward end 52 of shroud 24, with two covers or bars 60, 62 which overlap slots 54 and 56, respectively, when door 58 is in the closed position of FIG. 2. When door 58 slides to the open position, bars 60 and 62 move to allow access to the fiber 30 via slots 54 and 56, respectively, without the need for the fiber to extend outside of shroud 24, although this would be acceptable in alternative designs. Door 58 is slidably attached to shroud 24 with a snap fit resulting from two tongue-and-groove arrangements 64 and 66 (FIG. 1). In addition to preventing dust from entering through the slots, door 58 also prevents any light in the plug fibers from escaping and injuring a user's eyes. As discussed below in conjunction with FIG. 7, door 58 may also reveal, in the open position, one or more holes on the top of shroud 24 which may receive push rods to tip the fibers out openings 54 and 56 to allow cleaning of the fiber tips.

Other door arrangements may be provided for the plug. For example, it could have a door (not pictured) which raises vertically during the plug insertion process. This is accomplished by having the door sit in another part, such as a shuttle, that moves within the shroud body. The shuttle has a vertical slot on each of its side walls, and is open across each end. The solid door has a post that protrudes past the side walls of the shuttle, and into slots that exist in the shroud which have the following shape. Each of the slots starts at an upward angle (about 30°) for about 1 mm, then becomes horizontal for the majority of the distance, then rises again about 1 mm, and finishes with a second horizontal track (about 1.5 mm). When the plug comes into contact with a stop in the receptacle, it pushes the shuttle back within the shroud. During the first few millimeters of travel, the door is raised to its first position. In this position the fibers come in contact with the door, which deflects the fibers down at an obtuse angle, although this is not necessary. The door can also act as an alignment mechanism. This helps prevent end face contact of the plug fibers with the V-groove when they come into contact with the V-groove. Before the plug reaches full insertion, the shuttle reaches the second angled slot in the shroud. At this time the door is lifted to its final position, in which the door is no longer in contact with the fibers so that they are free to bow and provide adequate pressure on the receptacle. Returning of the shuttle and door is accomplished by a spring that pushes between the fiber holder and the shuttle. The particular advantage of this design is that it exposes the entire end of the plug, without any slot that the fibers must feed through to come into contact with the V-grooves.

In another door arrangement (not shown), the door slides across the plug during the insertion process, again using a shuttle that moves within the shroud body. The shuttle has a vertical slot on each of its side walls and is open across the end nearest the fiber holder. The end nearest the front of the shroud has an enclosed end with two vertical slots that are in line with the fibers, running from top to bottom. The door is nothing more than a rectangular plate, having two vertical slots that run from its bottom to about two material thicknesses from its top. Also, it has a notch cut in its top that rides in a ridge in the shroud. This ridge acts as the camming mechanism for the door. The cam is located on the inside of the roof of the shroud. From the front it starts at an obtuse angle until it reaches the center, where it runs down the length of its body. In the closed position the two sets of slots in the shuttle and door are offset from each other, providing a closed plug. When the plug comes into contact with a stop in the receptacle, it pushes the shuttle back within the shroud. During the first few millimeters of travel, the door slides sideways within the shroud at the same time the shuttle is moving backward. Once the two sets of slots are in line, providing an open slot for the fiber to exit through, the door has reached the straight section of the cam. At this point the door stops moving sideways and is carried back within the shroud by the shuttle. Returning of the shuttle and door is accomplished by a spring that pushes between the fiber holder and the shuttle. This design also exposes the entire end of the plug, and provides for smooth operation of the door. Variations of the plug design of the present invention will become apparent to those skilled in the art upon reference to the foregoing description.

A test plug may be used to test the operation of the receptacle. This plug would be essentially identical to the previously described plug, except that it receives a single fiber looped to have both ends extending toward the receptacle. In this manner, a signal may be sent down one of the receptacle fibers, received by the loop-back fiber in the plug, and then rerouted to the other receptacle fiber, which carries the signal to a test detection system.

Figure 4:
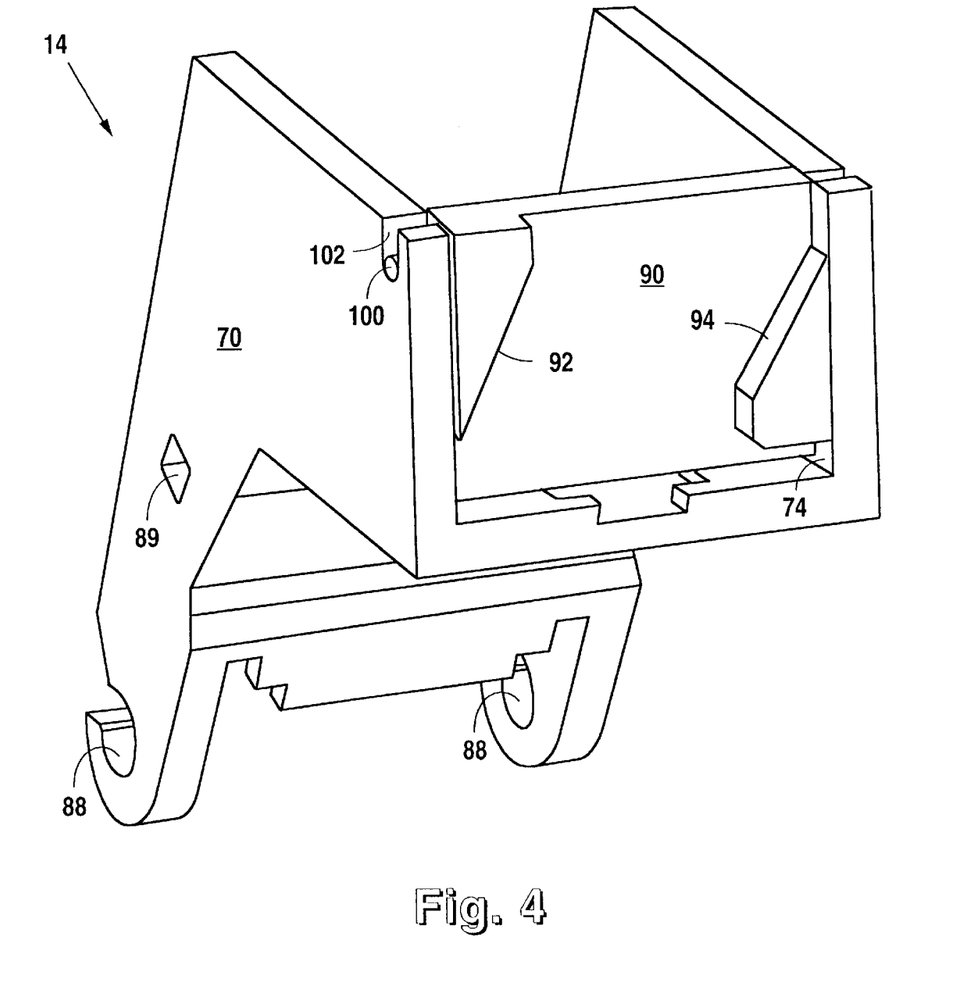
FIG. 4 is a perspective view of one embodiment of the fiber-to-fiber interconnection receptacle used with the plugs of FIGS. 1–3, with a hinged door having camming surfaces which cooperate with camming surfaces on the plug door.

Receptacle 14, also shown in FIG. 4, includes a body or housing 70 and another fiber holder 72. Housing 70 has an opening 74 whose size and shape generally corresponds to that of the forward end 52 of plug 12. Housing 70 may also have appropriate features (such as latch arms 76) allowing it to be releasably mounted to bulkhead 16 which may be, for example, a patch panel or workstation outlet (wall box faceplate). The latch means may provide for mounting from the front of the panel, to allow all preparatory work to be done at the front side of the panel, or may provide for mounting from the rear of the panel, to allow all preparatory work to be done at the back side of the panel. The receptacle fibers (only one of which, 78, is visible in FIG. 1 is secured to receptacle fiber holder 72 by clamping as well, using a clamping plate 80 adapted to grip the fibers at a first end of holder 72. The terminal ends of the receptacle fibers extend into fiber-alignment grooves formed in projections or fingers 82 at a second end of receptacle fiber holder 72. The grooves are preferably V-shaped, although they may be more rounded, i.e., U-shaped. An intermediate section 86 of the fiber-alignment grooves is curved so as to maintain the receptacle fibers in the grooves by the elastic urging of the slightly bowed fibers. Additional means may be provided, such as the fiber hold-down shown in FIG. 8, to retain the fibers firmly in the grooves. The fibers do not extend to the very tips of fingers 82 but rather terminate a sufficient distance from the tips to allow proper support of the plug fibers when the connector is in use. If the fiber-to-fiber contact occurs very near the tips of the V-grooves (or if the plug is inserted too far), the plug fiber can bend beyond the groove and lifted away from the apex, breaking the connection.

Receptacle 14 may have as many of these fingers with fiber-alignment grooves as there are fibers in plug 12. Fingers 82 and 84 are shaped to project into slots 54 and 56, respectively, of shroud 24 when plug 12 is fully inserted into receptacle 14. Fingers 82 enter shroud 24 at an oblique (nonzero) angle with respect the plug axis, i.e., the axis defined by either of the plug fibers 30 or 32 when they are extending straight within shroud 24. This angle is preferably about 42°, which balances concerns regarding fiber end face contact pressure, fiber forces directed into the V-groove, the effects of friction, and the desired tolerance window (a larger angle increases tolerances). Since the receptacle fibers are not directed toward opening 74, there is no danger of escaping light injuring a user's eyes. Receptacle fiber holder 72 is pivotally attached to housing 70 by providing posts on the first end of holder 72 which snap into cutouts or hooks 88 formed at one end of receptacle housing 70. Holder 72 releasably locks into place using bumps or studs formed on the side of the holder, which engage holes 89 in receptacle housing 70. An alternative design for the receptacle fiber holder may be used in which the holder is molded as a single piece with a breakaway top or cover plate that can snap onto its base, the base having the fiber-positioning grooves.

Interconnection receptacle 14 (as well as the termination receptacle described below) may also have a flap or door 90 to minimize entry of contaminants through opening 74. The disclosed embodiment uses a receptacle door which cooperates with the plug door to actuate plug door 58 between closed and open states as plug 12 is inserted into receptacle 14. Specifically, receptacle door 90 has two camming surfaces 92 and 94 which interact with camming surfaces 96 and 98, respectively, on plug door 58. Receptacle door 90 is hinged along one edge by providing posts 100 that snap into cutouts 102 in receptacle housing 70. Means (not shown), such as a spring or camming linkages molded into the part, may be used to bias door 90 in the closed position. When plug 12 is inserted into receptacle 14, forward end 52 and plug door 58 push against receptacle door 90, raising and opening it. The ramped camming surface 94 then begins to forcibly abut camming surface 98 on plug door 58, pushing door 58 to the side to reveal slots 54 and 56. If plug 12 is thereafter removed from receptacle 14, then ramped camming surface 92 similarly pushes against camming surface 96 as the plug is removed, sliding plug door 58 back into its closed position. Shroud 24 has grooves or indentations 104 and 106 to accommodate camming surfaces 92 and 94 when the plug is in the receptacle, which also serve to further stabilize the connection. Other door designs may be implemented with receptacle 14, such as a door which manually opened outward and snapped shut.

The receptacle may also have a door that acts as the latch for retaining the plug. In this alternative design (not shown), the plug body (shroud) has a notched area on its bottom side. The door in the receptacle is a rectangular, spring-loaded plate, with a tab (cantilever beam) protruding from its bottom when the door is in the closed position. When the plug is inserted into the receptacle, the door rotates from a vertical to a horizontal position. Once the plug is fully inserted, the notch clears the top edge of the door. Then the door springs back up a few degrees and bottoms out on the area in the notch. This provides the locking between the two parts. Removing the plug is accomplished by squeezing on the plug and tab portion of the door. This causes the door to return to its horizontal position and allows the plug to slide back out of the receptacle. The tab would be formed such that, when the plug is removed, there would not be enough friction to keep the finger on the tab. This construction provides for a simpler plug design.

The receptacle may further be modified with internal latches to be mounted in two different positions on the wall or bulkhead, a first position wherein it is fully operational and flush with the wall, and a second position wherein it projects slightly outward from the wall. This provides access to the interior of the receptacle for cleaning.

The plug-receptacle latching mechanism may advantageously be designed to prevent breakage of the plug assembly when the plug cable is pulled excessively, such as if someone trips over the cable. This is achieved by providing a latch geometry which allows the plug to be pulled out of the receptacle if the tension on the cable exceeds a given pull-out force. This results in the plug releasing from the receptacle rather than the cable pulling out of the plug, and this aspect is made more acceptable because of the automatic shutting of the plug door upon removal from the receptacle.

All of the components of connector 10 (except plug boot 38) may be formed of any durable material, preferably an injection moldable polymer such as polycarbonate, VALOX (a polyester sold by General Electric), or RADEL (a polyarylsulfone sold by Amoco). The material may include conductive fillers to render the components semiconductive in order to minimize triboelectric charging which can induce fiber end contamination. Boot 38 is preferably formed of low modulus copolyester elastomer such as that available from RTP of Winona, Minn., under material number 1559X67420B.

Assembly and installation of connector 10 is straightforward. Plug 12 is typically assembled in the factory, although it may easily be assembled in the field. In this regard, the term "pre-terminated" as used herein simply refers to the attachment of optical fibers to plug 12 or receptacle 14 regardless of whether such attachment occurs in the factory, the field, or elsewhere. It is also understood that plug 12 or receptacle 14 could be mounted on a jumper cable or patch cord with any kind of optical connector at the other end of the fibers. It is recommended that fibers be used which have a longer life when exposed to indoor environments, such as the high-strength fibers available from Minnesota Mining and Manufacturing Co. (3M, co-owner of the present invention). Those fibers have a conventional core and cladding which is surrounded by a novel three-layer construction, as discussed in U.S. Pat. No. 5,381,504. Those skilled in the art will also appreciate that the connector of the present invention can accommodate discrete optical fibers or multifiber ribbons, as well as both singlemode and multimode fibers.

Fibers which are to be pre-terminated to either plug 12 or receptacle 14 should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from fiber holder 18 which, in the preferred embodiment, is about 23 mm. For attachment of fibers to receptacle 14, the cleave length is the distance from fiber holder 72 which, in the preferred embodiment, is about 15 mm. Any debris should be cleaned off the fibers using a lint-free cloth. Prior to removing the fibers from the cleaver, the craftsperson may inspect the fibers to confirm that the end faces on all fibers are acceptable, i.e., that they are smooth cleaves with no spikes. The fiber viewer disclosed in U.S. Pat. No. 5,210,647 may be used for this purpose. Once the craftsperson is satisfied that each of the fibers has an acceptable end face, the fibers may be removed from the cleaver. In the preferred embodiment, the fiber end faces are flat with a chamfered or beveled periphery (or at least partially beveled) to obtain the advantages associated with such a fiber end profile, as discussed more thoroughly in U.S. patent application Ser. No. 08/122,755. The fiber end faces may alternatively be radiused (generally spherical). The fibers may further optionally be provided with an asymmetric treatment, like cleaving so as to impart an angled end face, as taught in U.S. Pat. No. 5,048,908. If so, in order to minimize insertion losses and reflections, the fibers should be inserted so that the orientation of the angled end faces of one set of fibers (i.e., in plug 12) complements the orientation of the angled end faces of the other set of fibers (i.e., in receptacle 14). For the plug fibers, fiber preparation may be done after the fiber cable has been threaded through boot 38.

Final assembly of plug 12 comprises the simple steps of clamping the fibers in the V-grooves of holder 18 and snapping shroud 24 onto holder 18. An assembly fixture may be used to guide shroud 24 onto the plug fiber holder so as to avoid damaging the fibers as they are inserted into the shroud. The ends of the plug fibers should terminate about 0.5 mm from the end of the shroud. Completion of receptacle 14 is also simple. The receptacle fibers are clamped onto fiber holder 72 using clamping plate 80, with the ends of the receptacle fibers terminating in the fiber-alignment grooves about 15 mm from the tips of fingers 82 and 84. The receptacle fibers may be cleaved after securing them to the fiber holder. The fibers may be assembled into the holder using the V-groove to actually pick up the fiber holder from the cleaver, to avoid contamination of the fiber tips, if mating and guiding features are provided on one or both parts. A punch-down tool could also be used to simplify assembly. Fiber holder 72 is attached to housing 70, first by pushing the pivot posts into cutouts 88, and then snapping the studs into holes 89. Care should be taken during placement of the fibers in the V-grooves and attachment of the holder to the receptacle to not contaminate the fiber tips.

Installation of connector 10 is equally straightforward. Receptacle 14 is optionally mounted to any desired surface by convenient means, such as latching arms 76 (other constructions could be molded into housing 70 for custom mounting). Several receptacles could also be mounted in a single module, and they can be designed for front or rear loading, or sliding from the side. After receptacle 14 is mounted, the connection is completed by simply inserting plug 12 into opening 74. Plug 12 is released from receptacle 14 by latch 40.

FIG. 1 depicts full insertion of the plug. As plug 12 is inserted, door 90 opens and cams door 58 open as described above, allowing fingers 82 and 84 to enter slots 54 and 56 respectively. Plug fibers 30 and 32 contact the fiber-alignment grooves in fiber holder 72, and slide until their end faces abut the respective end faces of the receptacle fibers, and then become bowed when the plug is fully inserted. The plug fibers may undergo an S-shaped bend. All force at the fiber-to-fiber interface comes from the resilience (elastic deformation) of bowed fibers 30 and 32 which maintains a continuous compressive load between the ends. Connector 10 is preferably designed to maintain a minimum bend radius of 0.3" (7.6 mm) on the fibers.

The dimensions of the various components of connector 10 may vary considerably depending upon the desired application. The following approximate dimensions are considered exemplary. Plug 12 has an overall length of 57 mm, a width of 12 mm, and a thickness of 8 mm, and plug fiber holder 18 provides clamping grooves that are 13 mm long. Plug shroud 24 extends 25 mm beyond holder 18, providing an interior space which is 24 mm long, 10 mm wide and 6 mm high. Opening 74 of receptacle 14 is 12 mm x 10 mm. Its overall height and depth are 38 mm and 36 mm. Receptacle fiber holder 72 is 20 mm long (from the end where the fibers are clamped to the tips of fingers 82 and 84), 12 mm wide and 1.5 mm thick. The fiber-alignment grooves in fingers 82 and 84 are 11.5 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise.

Figure 5:
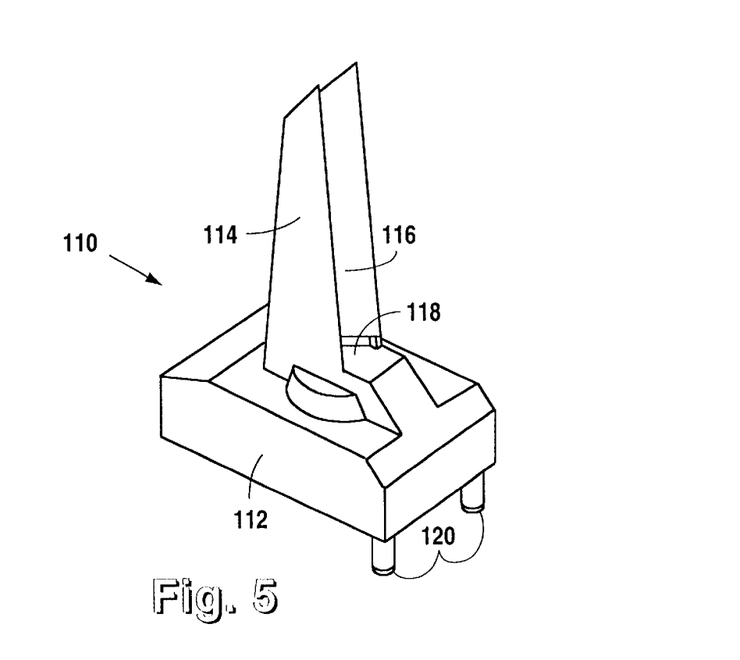
FIG. 5 is a perspective view of a termination fixture which may be used in the active device receptacle of the present invention.
Figure 6:
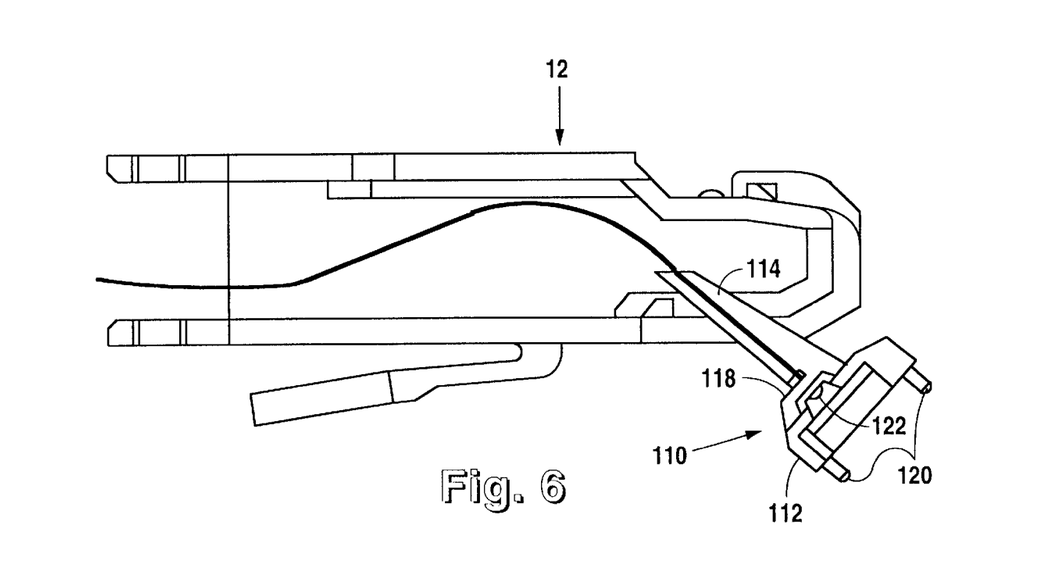
FIG. 6 is a longitudinal section of a termination using a plug and the termination fixture of FIG. 5.

The present invention is directed to a fiber optic termination which is particularly useful with the foregoing connectors for fiber-to-fiber interconnection. FIG. 5 illustrates one embodiment 110 of a termination fixture of the present invention adapted for use with an active device. Fixture 110 is essentially substituted for receptacle fiber holder 72 of fiber-to-fiber receptacle 14, and has a base 112 and a projection or finger 114 similar to fingers 82, 84. Finger 114 has a fiber-alignment groove 116 to receive one of the plug fibers whose terminal end face comes to rest on a fiber stop or surface 118, as shown in FIG. 6. The force applied to the fiber is designed to be sufficient to remove any air gap between the fiber end face and surface 118, but not so great as to lead to degradation of the fiber end face as it moves across surface 118 such as from scratching. The light-transmitting material defining surface 118 is usually clear (i.e., transparent to the wavelength of light transmitted in the optical fibers), allowing the active optical device to be placed on the other side of base 112 whereby the light signal passes through the material; the material may be coated or otherwise fabricated to affect the light signal, such as controlling its intensity or polarizing it. Posts 120 formed on base 112 may be used to align and attach fixture 110 to the active device substrate, e.g., a printed circuit board (PCB). A fiber stub may also be placed in V-groove 116 with one end of the fiber stub at fiber stop 118, and the other end located in an intermediate portion of groove 116 to interconnect with the fiber to be terminated.

Fixture 110 preferably has a unitary construction of a clear, injection-moldable polymer such as ULTEM (a polyetherimide available from General Electric), and may further include a lens 122 formed opposite surface 118 to focus light from/to the fiber. The active optical devices and supporting structures are beyond the scope of the present invention but may include, for example, photoelectric sensors or laser diodes. Other passive optical devices (beam splitters, stub fibers in ferrules, etc.) which direct the light to or from the active devices may be employed, and different geometries of the termination fixture may be used to direct or focus light to a particular location, including geometries which employ total internal reflection (TIR). The TIR method of coupling light from a bare fiber onto a photodetector, or from a light source into a fiber, using the present invention has a number of advantages. One is the that the position of the fiber is determined by the fiber stop, allowing the plug fiber to be repeatably located in the same position. The position of the fiber end is thus predetermined by the tolerances on the molded part and the location accuracy of the active elements, i.e., the photodetector or light source, hence this obviates the need for active optical alignment. Another advantage is that, coupled with an S-bend of the fiber, the overall height of the transceiver module can be reduced. An S-bend could also be used in a connector for two parallel, but not coaxial, fibers. Finally, the transceiver electronics can be mounted on a board that lies in the same plane in which the connector is inserted. A fiber stub may also be used in an active device termination, the stub (not shown) secured in a holder like receptacle holder 72.

Besides providing for quick and easy connection and disconnection, connector 10 has several other advantages As previously mentioned, it may easily be pre-terminated in the field as well as the factory. Even if the fibers in either the plug or receptacle do not terminate at exactly the desired position there will still be full fiber-to-fiber contact in the completed connection since the resilient stress of the bent fibers provides a positive abutment force; in other words, the tolerance in the relative positions of a fiber pair is eased by the slack in the plug fibers. Plug 12 is also inherently pull-proof due to this biasing. Tolerances are also not critical in the transverse position of a given fiber pair since V-grooves 36 serve to align the fibers and the fibers are biased toward the apex of the grooves. The surface finish of the fiber-alignment grooves should be smooth and the groove angle be well-defined; this finish is easy to fabricate using standard injection molding techniques. The V-groove preferably has a sharpness with no more than a 0.001" (0.025 mm) radius. It is preferable to use a material for the V-groove substrate which is hard, to resist abrasion, but also having a low coefficient of friction to minimize frictional forces on the fiber as it slides in the groove. Also, since the receptacle fibers enter housing 70 at an oblique angle (up to 90°) with respect to the plug axis, it requires very little depth for mounting. Moreover, the mounting methods are compatible with those of RJ45 jacks. Finally, the reduced part count and the fact that all parts can be injection molded contribute to a very low cost connector.

Figure 7:
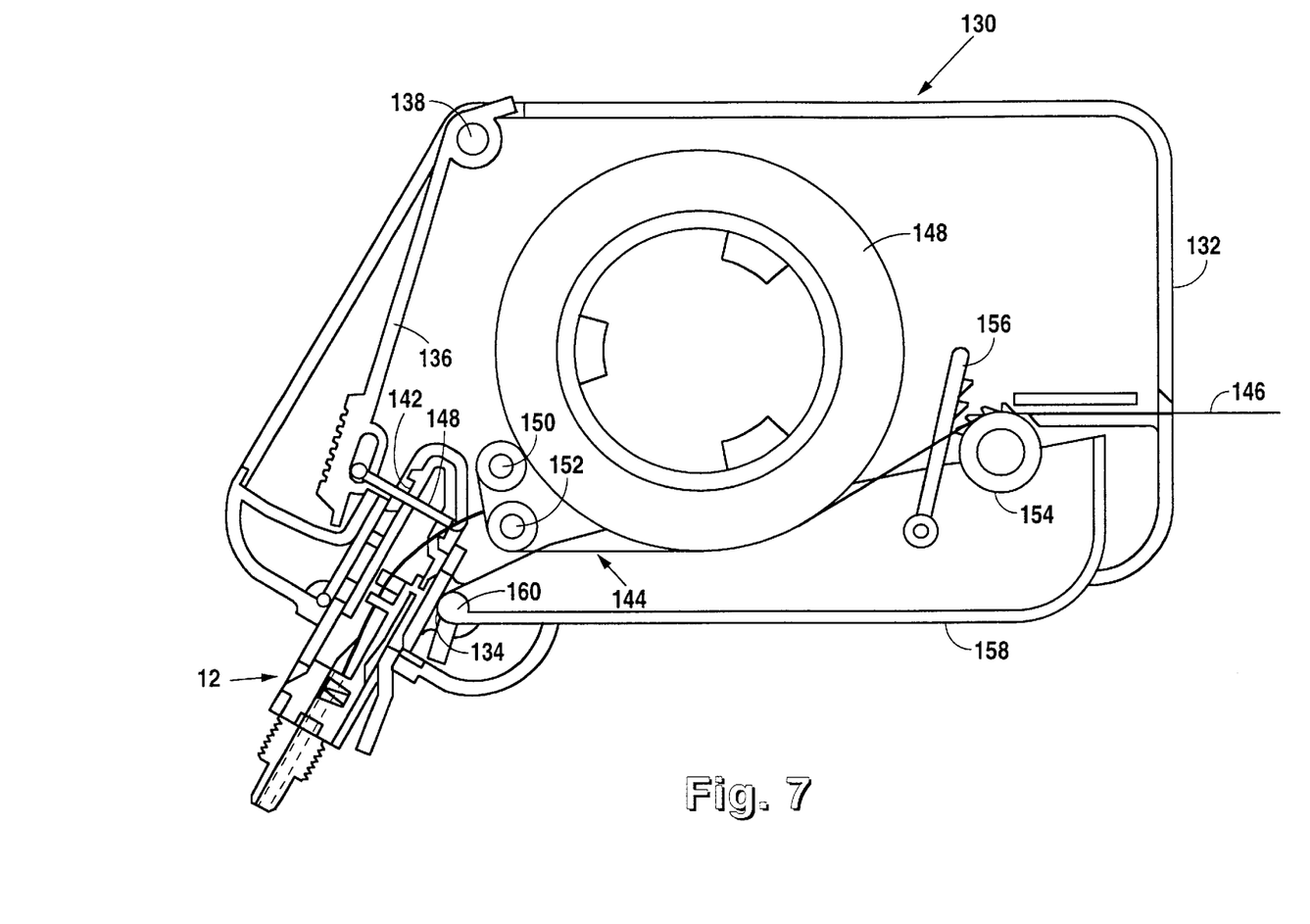
FIG. 7 is a sectional view of a tool used to clean the tips of the fibers in a plug.
Figure 8:
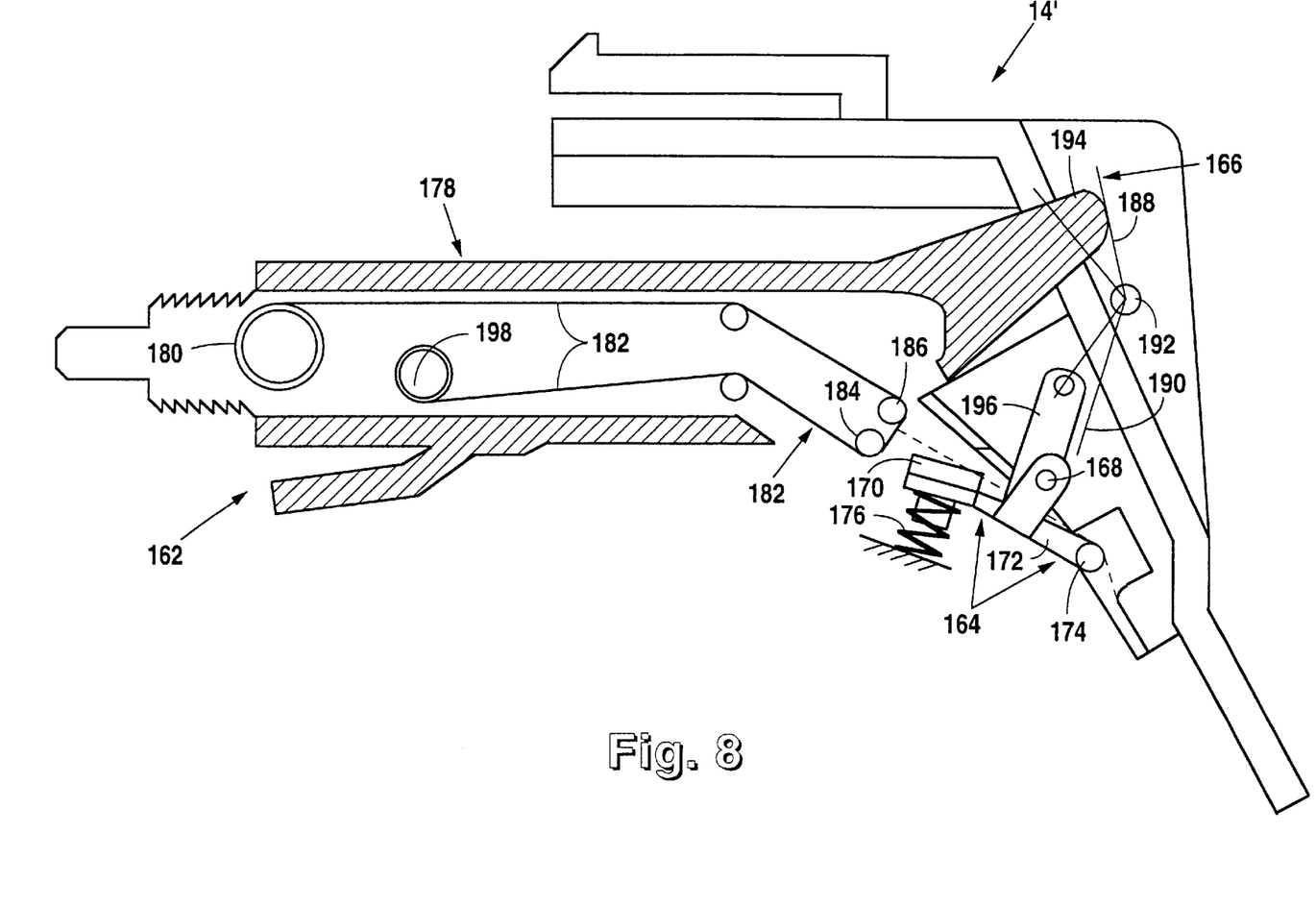
FIG. 8 is a sectional view of a tool used to clean the tips of the fibers in a receptacle.

With further reference to FIGS. 7 and 8, those figures depict tools which may be used in conjunction with the present invention, to clean the tips of the various optical fibers. FIG. 7 shows a tool 130 used to clean the tips of the fibers in plug 12. Tool 130 has a body 132 adapted to be held in the hand, with an opening 134 in body 132 for receiving plug 12. Tool 130 also has an actuation member or lever 136 pivotally attached to body 130 at 138. In FIG. 7, lever 136 is shown in the actuated position, in which state a push rod or tab 140 enters a hole or slot 142 in the top of the plug shroud, and contacts the plug fibers, forcing them out of the shroud through slots 54, 56. In the unactuated position, lever 136 swings away from opening 132 and retracts push tab 140 so that plug 12 can enter tool 130 without interfering with the push tab. Lever 136 is preferably biased toward the unactuated position by, e.g., a spring.

Opening 134 and lever 136 are located such that the plug fibers, when pushed through the shroud slots, are forcibly abutted against the adhesive side 144 of a strip of tape 146. Tape 146 is peeled away from a tape roll 148 which is stored in tool body 132. Two rollers 150 and 152 are provided to allow the tape to advance so that a fresh adhesive surface is presented to the fiber tips. To facilitate use, tape 146 may be wound about another roller 154 forming a ratchet wheel which engages a pawl 156. Pawl 156 is in turn located on another handle or pivoting lever 158 attached to tool body at 160. In this manner, the user may advance the tape and clean the plug fibers by squeezing handle 158 while holding the tool. Handle 158 may also be biased by, e.g., a spring, toward the outermost position.

FIG. 8 shows a tool 162 used to clean the tips of the fibers in a modified receptacle 14'. The shape of tool 162 is reminiscent of plug 12, whereby it is adapted to be inserted into receptacle 14' in a similar manner. Receptacle 14' is generally identical to receptacle 14, except for the provision of certain features designed to raise the receptacle fibers up out of the V-grooves for cleaning. These features include a fiber hold-down or retainer 164 and a tilt linkage 166. Fiber retainer 164 is pivotally attached to the fiber holder at 168, and includes a block or pad 170 located at one end of the retainer arm 172 adapted to push the fibers into the V-groove and keep them nested properly therein. Pad 170 may be molded into the fiber holddown. The other end of retainer arm 172 has formed thereon a boss or button 174 which pushes against the receptacle fibers when retainer arm 172 is in the actuated position, as shown in FIG. 8. Pushing of the fibers by boss 174 causes the fibers to deflect out of the V-grooves. Fiber retainer 164 is preferably biased, e.g., by a spring 176, toward the unactuated position, i.e., pushing pad 170 against the fibers to maintain them in the V-grooves.

Tool 162 includes a body 178 which, like tool 130, also houses a supply spool 180 of adhesive tape 182. Rollers 184 and 186 serve to position tape 182 such that its adhesive side can again be advanced to clean the fiber tips. The fibers are deflected when tool 162 enters receptacle 14' by means of tilt linkage 166, which includes two tilt arms 188 and 190 fixed together at another pivot point 192. A projection or actuator bump 194 formed on the front end of tool 162 pushes against tilt arm 188 as the tool is inserted into the receptacle. This in turn causes tilt arm 190 to rotate and push against a catch or finger 196 attached to fiber retainer 164. Forcible contact between tilt arm 190 and finger 196 causes fiber retainer 164 to pivot about point 168, thereby pushing boss 174 against the fibers and deflecting them out of the V-grooves. Tape 182 in tool 162 may be taken-up on another spool 198, or exit tool body 178 in a manner similar to that shown in FIG. 7 for tool 130. A small dial or twist rod may be attached to take-up spool 198 and extend outside of body 178 to allow the user to advance the tape.

Figure 9:
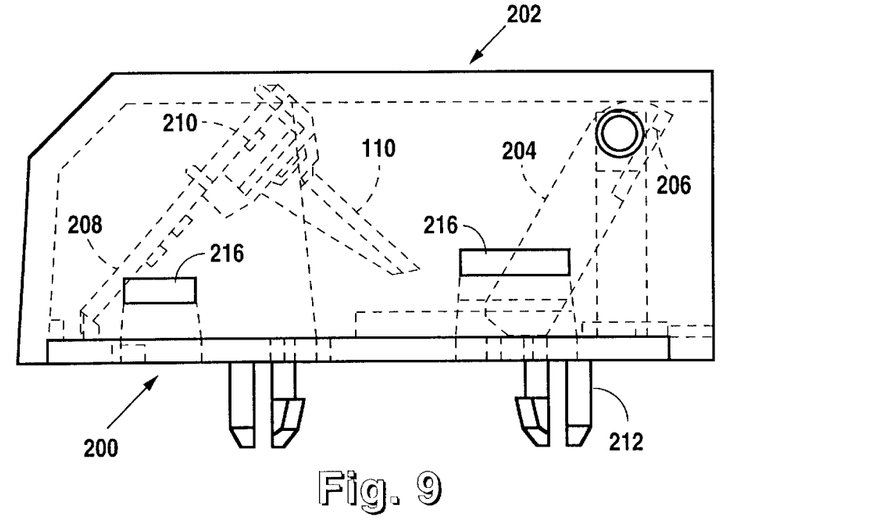
FIG. 9 is a side elevational view of one embodiment of the active device receptacle of the present invention.
Figure 10:
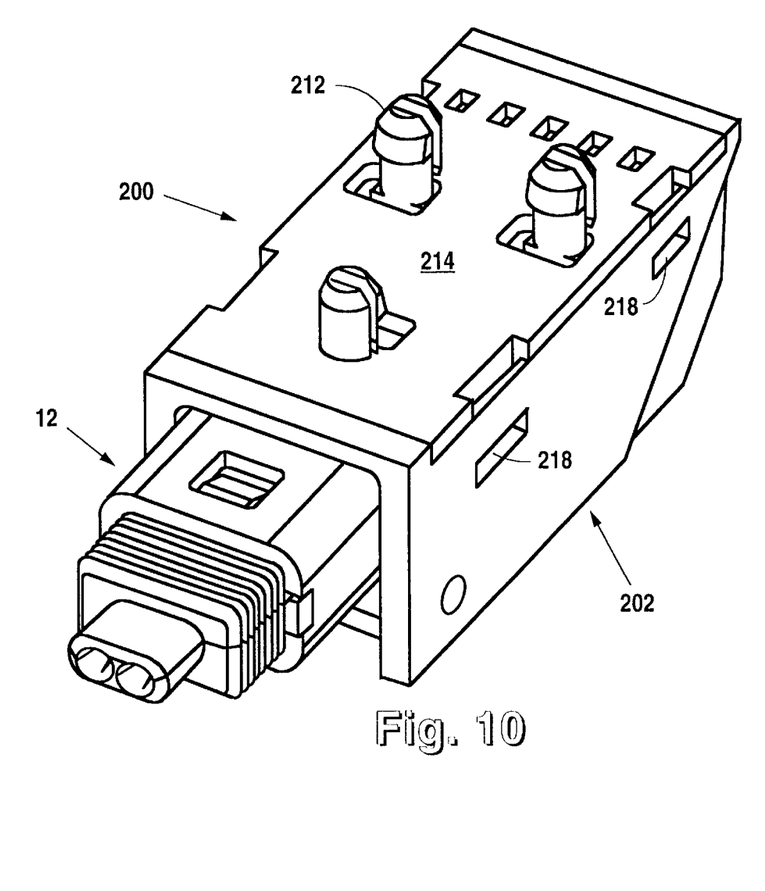
FIG. 10 is a bottom perspective view of the active device receptacle of FIG. 9.

FIGS. 9 and 10 depict additional features of one embodiment 200 of the active device receptacle of the present invention. In this embodiment, active device receptacle 200 includes a body or housing 202 enclosing a termination fixture 110 and which is adapted to receive a fiber optic plug such as plug 12. Housing 202 has a spring-loaded door 204 to keep debris from entering the receptacle opening when the receptacle is not in use. Door 204 has appropriate latching features 206 to complement a plug latch such as 40' described above. Fixture 110 is mounted by means of its posts 120 to a substrate 208 such as a printed circuit board (PCB). PCB 208 also supports an optoeletronic device 210 (such as a photodetector or semiconductor light source) which is located at an appropriate position on PCB 208 with respect to the termination fixture, i.e., With respect to lens 122 and so operatively connected to the terminal end of any fiber which is terminated in the fixture and abutting the fiber stop 118. Any conventional active device may be used. Other electronic components may be mounted on PCB 208, Such as LED drivers or data quantizers. PCB 208 is preferably mounted at an angle of about 48° with respect to the axis of the receptacle housing, i.e., with respect to the axis of the plug as it enters the receptacle, in order to position the fixture projection 114 at an appropriate angle for receiving the terminal end of the fiber.

With reference to FIG. 10, means may be provided to attach receptacle 200 to another structure, such as another PCB (motherboard), the means comprising in this embodiment several latching posts 212 attached to the underside of housing 202. Posts 212 may be integrally formed with a bottom plate 214 that is removably attached to housing 202 by means of additional latch arms 216 formed on bottom plate which engage openings or slots 218 formed in the sidewalls of housing 202. Latch arms 216 also serve to secure substrate 208 as seen in FIG. 9.

Figures 11, 12, 13:
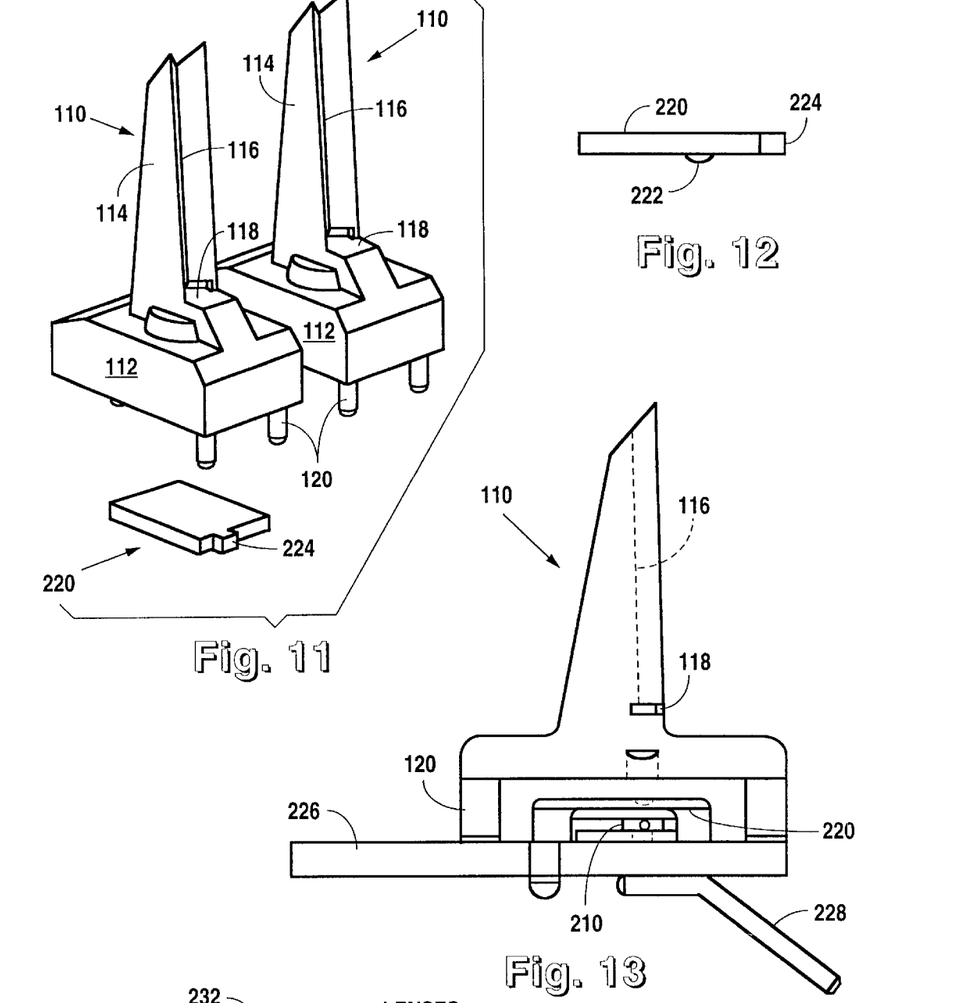
FIG. 11 is a perspective view showing two fiber optic termination fixtures and an optical plate used with one or more of the fixtures.
FIG. 12 is a side elevational view of one optical plate.
FIG. 13 is a side elevational view of a termination fixture, such as in a series of such fixtures, mounted to a substrate for electrical interconnection.

FIG. 11 illustrates how a plurality of termination fixtures may be placed in series, side-by-side, to receive a plurality of optical fiber terminations in a small volume of space. FIG. 11 also illustrates the use of an insert piece or optical plate 220 which may be attached to any of the termination fixtures to change the desired optical characteristics. For example, plate 220 may have a lens 222 formed therein to supplement, or substitute for, lens 122. In the depicted embodiment, the lens is formed by a diamond pin in the mold tool, and has a radius of curvature of about 0.01458" (0.37 mm); the height of the lens is 0.004" (0.10 mm) and the remaining thickness of optical plate 220 is about 0.022" (0.56 mm). This lens 222 is used in conjunction with a lens 122 having a radius of curvature of about 0.01193" (0.30 mm) and having a height of about 0.01" (0.25 mm). When optical plate 220 is properly located in base 112 of fixture 110, lens 122 is located about 0.02" (0.51 mm) above the upper surface of plate 220. The distance from the surface of fiber stop 118 to the bottom of the fixture (i.e., to the top of the PCB substrate 208) is about 0.12" (3.05 mm). The thickness of the light-transmitting portion of the fixture base (from the tip of lens 122 to fiber stop 18) is about 0.04" (1.02 mm). Other optical features may be used as desired, such as polarizers, diffraction or holographic gratings, filters, microstructured surfaces, a Fresnel lens, etc. The feature is placed at an appropriate location on plate 220 to align with fiber stop 118, and plate 220 may further be mechanically polarized or keyed so that it can be placed in the base 112 of fixture 110 in only one orientation. Keying may be provided by forming a bump 224 on plate 220 which fits with a notch formed in the underside of base 112.

FIG. 13 illustrates how one of a series of termination fixtures may be placed on a substrate, such as another PCB 226, in the side-by-side fashion of FIG. 12. Leads 228 may be formed on the opposite side of PCB 226 to interconnect the respective active devices with other control electronics.

Figure 14:
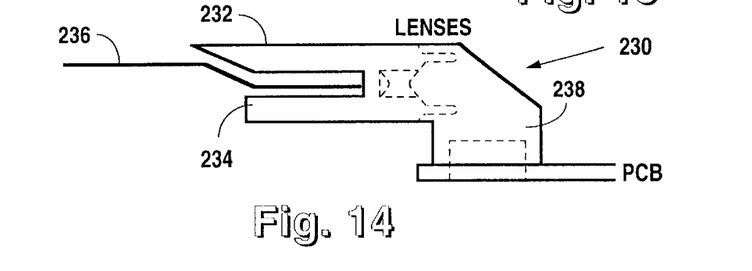
FIG. 14 is a side elevational view of a modified termination fixture having projects, each project having a fiber-receiving groove therein.

FIG. 14 depicts two optional modifications to the termination fixture. The modified fixture 230 has two fingers or projections 232 and 234, each having a fiber-receiving groove therein, positioned to induce an double bend, or S-bend, in the fiber 236 to be terminated. Fixture 230 also has a base portion 238 designed for total internal reflection of the light signal. Fixture 230 may be formed of two pieces, one having the V-groove projections and an integrally molded lens, and the other have the TIR base also with one or more integrally molded lenses. The various surfaces of the base may be coated to provide improved reflection, or shaped into lenses or other structured surfaces to internally focus the light in any desired manner. Lens prescriptions may be different for transmitter and receiver elements. The coating may be used to control the amount of light reflected in some applications.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A fixture for terminating an optical fiber, comprising:
   a base having a light-transmitting portion;
   a projection attached to said base proximate said light-transmitting portion thereof, said projection having a fiber-receiving groove directed toward a fiber stop surface located on said light-transmitting portion of said base; and
   means for aligning said light-transmitting portion of said base with an active device.

2. The termination fixture of claim 1 wherein said base has a lens integrally formed with said light-transmitting portion thereof.

3. The termination fixture of claim wherein said aligning means comprises posts attached to said base.

4. The termination fixture of claim 1 wherein said light-transmitting portion of said base has a plurality of surfaces positioned to provide total internal reflection of a light beam directed at said fiber stop surface.

5. The termination fixture of claim 1 further comprising insert means for changing an optical characteristic of the fixture.

6. The termination fixture of claim 1 Wherein said fiber-receiving groove is generally straight and said fiber stop surface is generally orthogonal to said fiber-receiving groove.

7. The termination fixture of claim 2 wherein said lens is formed on said light-transmitting portion of said base opposite from said fiber stop surface.

8. The termination fixture of claim 5 wherein said insert means comprises an optical plate member sized to fit in a corresponding cutout in said base proximate said light-transmitting portion thereof.

9. The termination fixture of claim 8 wherein said optical plate has a lens integrally formed therewith.

10. The termination fixture of claim 8 wherein said optical plate is mechanically polarized to fit only one way in said cutout in said base.

11. A device for terminating an optical fiber, comprising:
    a housing having an opening for receiving the terminal end of an optical fiber;
    at least one termination fixture located in said housing, said fixture including a base and a projection attached to said base proximate a light-transmitting portion thereof, said projection having a fiber-receiving groove with a first end directed generally toward said opening of said housing, and a second end directed toward a fiber stop surface located on said light-transmitting portion of said base; and
    at least one active device located in said housing and positioned with respect to said termination fixture to operatively connect with said light-transmitting portion of said base.

12. The device of claim 11 wherein:
    said active device is mounted on a substrate;
    said termination fixture is mounted on said substrate; and
    said substrate is attached to an interior portion of said housing.

13. The device of claim 11 wherein said housing has a door located at said opening biased to a closed position, said door having latch means for releasably receiving an optical fiber plug.

14. The device of claim 11 wherein said housing has at least two of said termination fixtures, and at least two of said active devices operatively connected, respectively, to said two termination fixtures.

15. The device of claim 11 further comprising insert means for changing an optical characteristic of said termination fixture.

16. The device of claim 12 wherein said housing includes a removable plate allowing access to an interior portion of said housing, said plate having latch arms which attach to said housing and secure said substrate in said housing.

17. The device of claim 15 wherein:
    said two active devices are mounted on a common substrate;
    said two termination fixtures are mounted on said common substrate; and
    said substrate is attached to an interior portion of said housing.

18. An active device receptacle comprising:

a housing having
- an opening for receiving the terminal portion of an optical fiber,
- a door located at said opening, biased to a closed position and having latch means for releasably receiving an optical fiber plug,
- means for attaching said housing to an external structure, and
- a removable plate allowing access to an interior of said housing;

a substrate attached to an interior portion of said housing;

at least one termination fixture mounted on said substrate, said fixture including a base and a projection attached to said base proximate a light-transmitting portion thereof, said projection having a fiber-receiving groove with a first end directed generally toward said opening of said housing, and a second end directed toward a fiber stop surface located on said light-transmitting portion of said base, said base having a lens integrally formed with said light-transmitting portion thereof;

at least one active device mounted on said substrate and positioned with respect to said termination fixture to operatively connect with said light-transmitting portion of said base; and an optical plate having a lens inserted in an optical path between said light-transmitting portion of said base of said termination fixture and said active device.

19. A fixture for terminating an optical fiber, comprising:

a base with a light-transmitting portion formed integrally therein;

a projection attached to said base, said projection having a fiber-receiving groove directed toward a fiber stop surface; and at least one protrusion adapted to align said light-transmitting portion of said base with an active device.

20. The fixture of claim 19, wherein said projection extends essentially perpendicularly from said base.

21. A fixture for terminating an optical fiber, comprising:

a base having first and second major opposing surfaces and a light-transmitting portion extending between said first and second surfaces;

a projection extending from said first surface, said projection having a fiber-receiving groove therein which is directed toward said light-transmitting portion of said base; and aligning means for aligning said light-transmitting portion of said base with an active device.

22. The fixture of claim 21, wherein said aligning means comprises at least one protrusion.

23. The fixture of claim 22, wherein said protrusion extends from said second surface of said base.

24. The fixture of claim 21, wherein said projection extends from an interior portion of said first surface.

25. The fixture of claim 21, further comprising an optical plate equipped with a lens which is disposed in an optical path between said light-transmitting portion of said base and said active device.

26. In combination with an active device, a fixture for terminating an optical fiber, comprising:

a base having a light-transmitting portion, said base being releasably attachable to said active device;

a projection attached to said base, said projection having a fiber-receiving groove directed toward a fiber stop surface; and aligning means for aligning said light-transmitting portion of said base with said active device.

27. A fixture for terminating an optical fiber, comprising:

a base with an aperture disposed in the interior thereof;

a lens, disposed within said aperture;

a projection attached to said base, said projection having a fiber-receiving groove therein adapted to guide the end of an optical fiber into optical communication with said lens; and an alignment mechanism adapted to align said lens with an active device.

* * * * *

UNITED STATES PATENT AND TRADEMARK OFFICE
CERTIFICATE OF CORRECTION

PATENT NO.: 6,086,263

DATED: July 11, 2000

INVENTOR(S): Raman K. Selli, Donald G. Doss, George W. Parrett, James K. Guenter and Phillip W. Waltrip It is certified that error appears in the above-identified patent and that said Letters Patent is hereby corrected as shown below:

On the cover page of the patent, after the heading "Assignee", add -- Honeywell, Inc., Richardson, Texas -- after -- 3M Innovative Properties Company, St. Paul, Minn. --

Col. 14, line 1, insert -- 1 -- after "claim".

Signed and Sealed this

Thirty-first Day of October, 2000

*Attest:*

Q. TODD DICKINSON

*Attesting Officer*  *Director of Patents and Trademarks*